Figure 1:
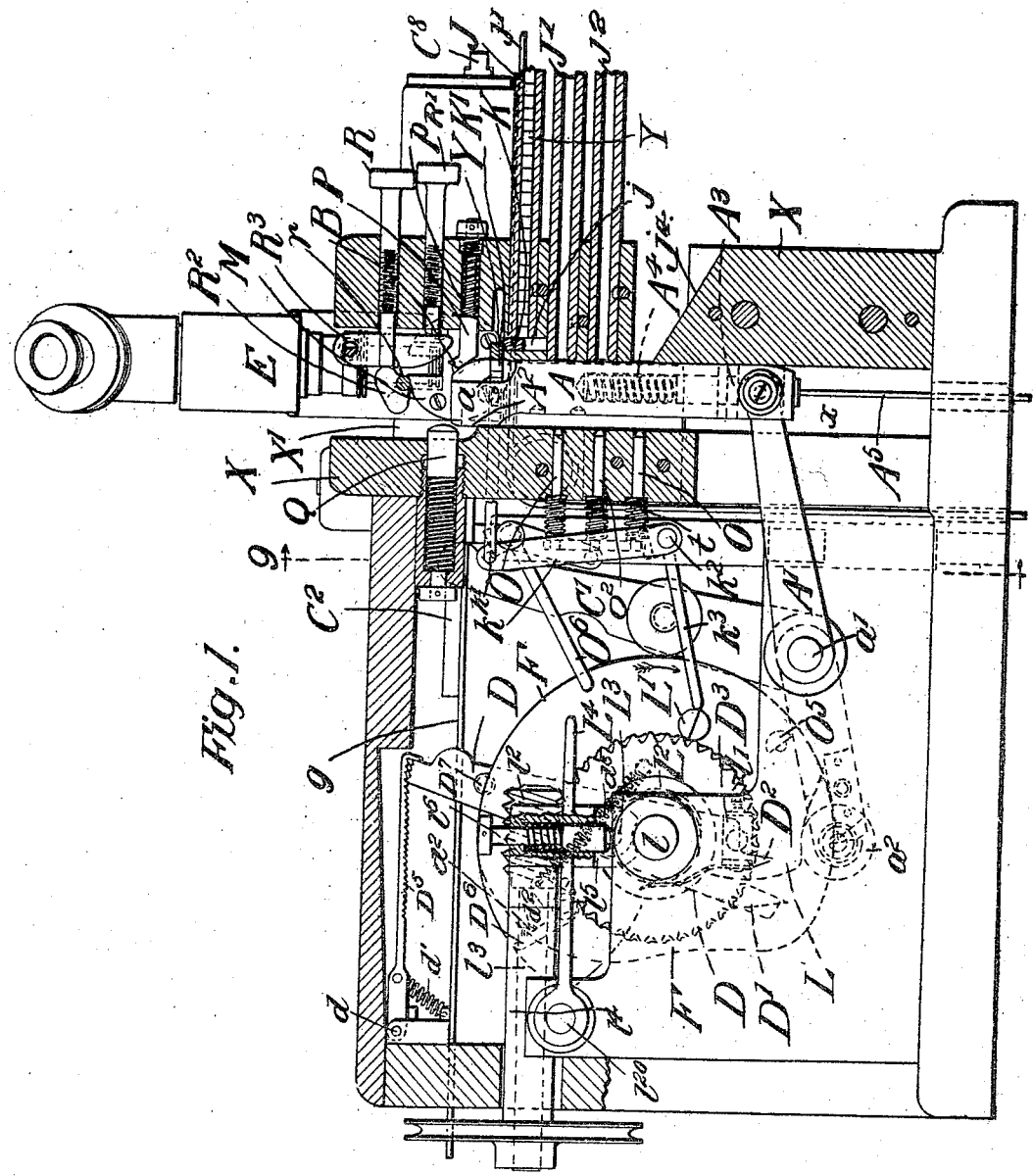

F. H. PIERPONT.
MATRIX GAGING AND SORTING MACHINE.
APPLICATION FILED APR. 11, 1911.

1,149,284.

Patented Aug. 10, 1915.
15 SHEETS—SHEET 1.

Witnesses

Inventor
F. H. Pierpont
by Church & Church
his Attys.

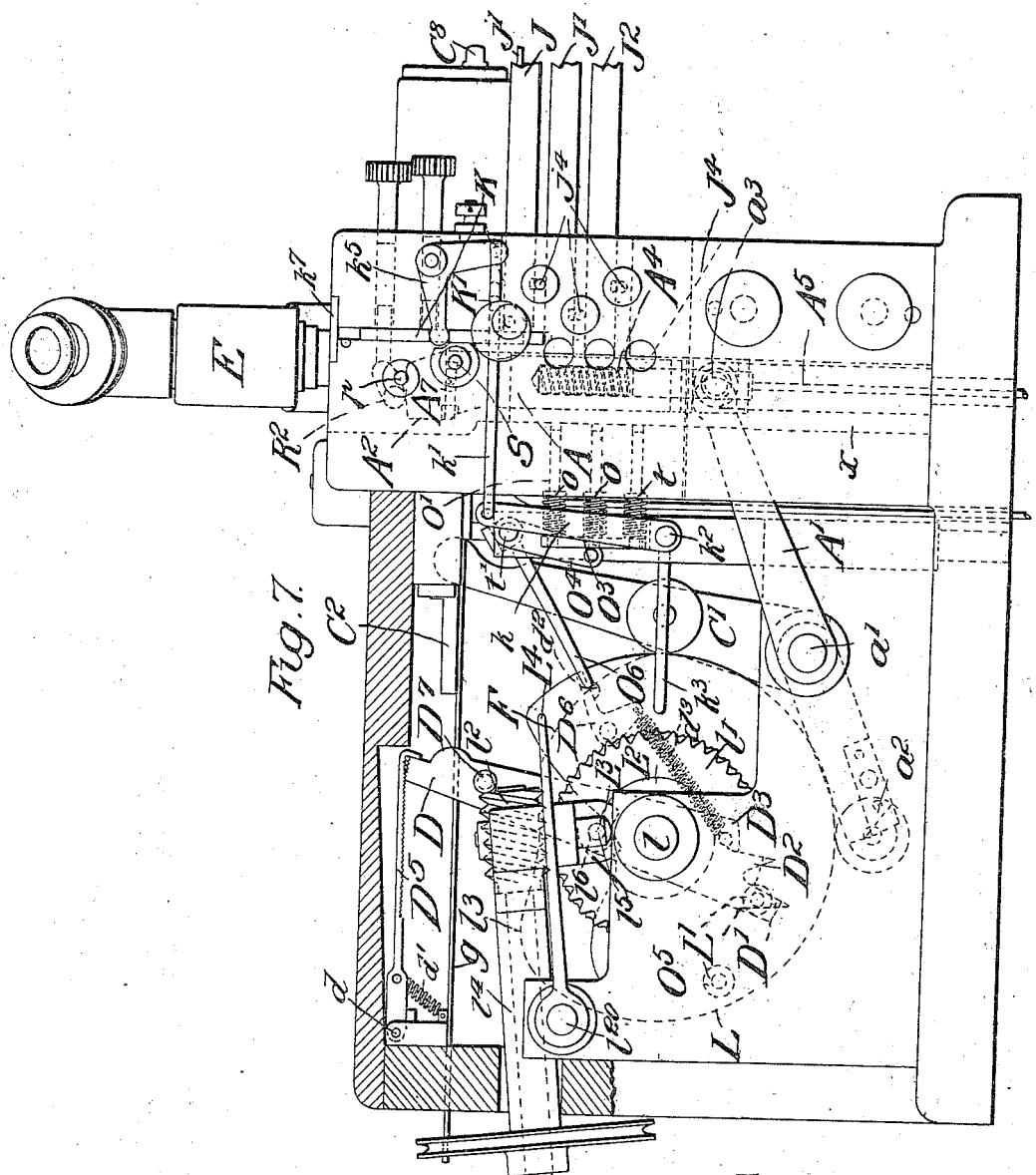

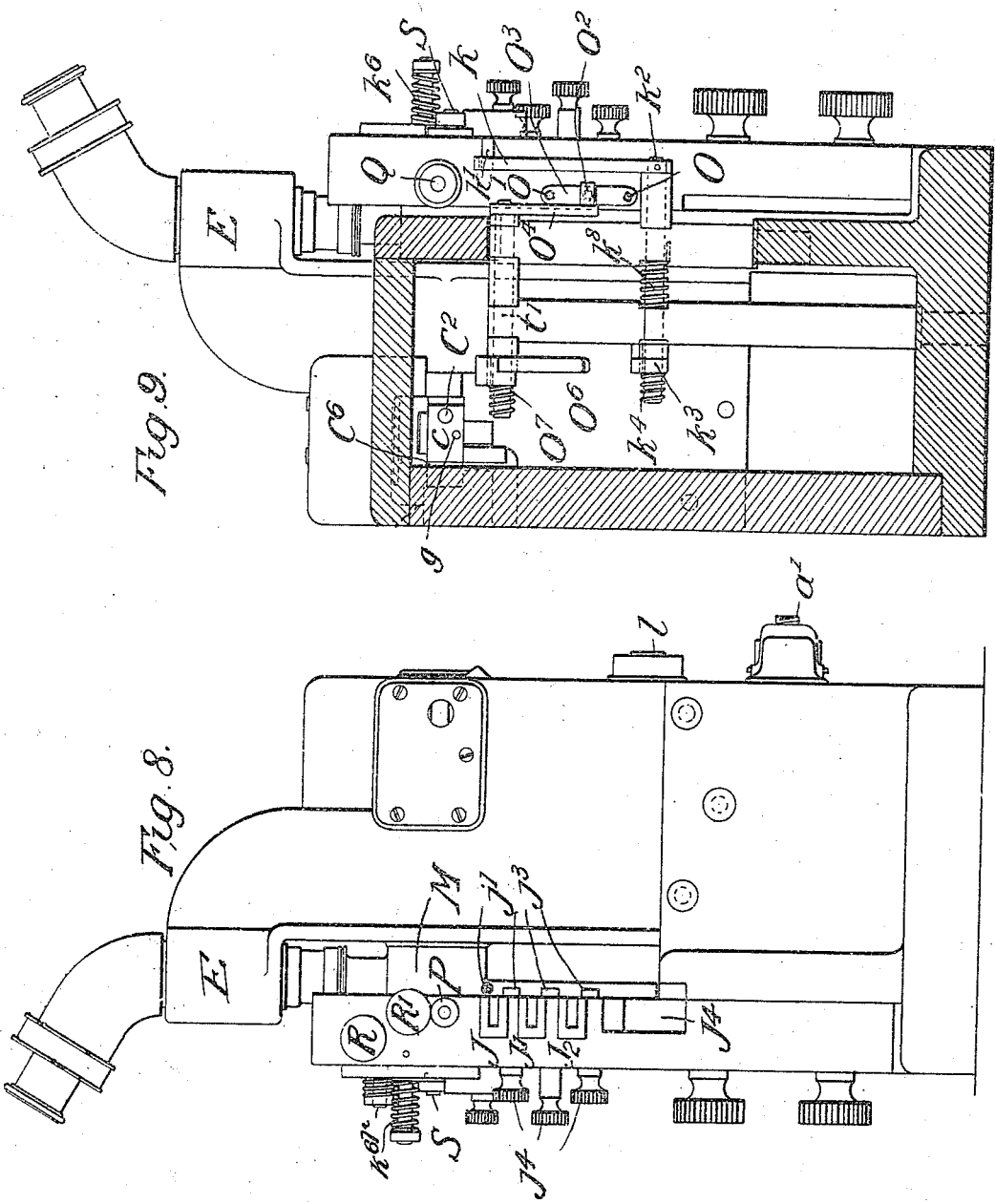

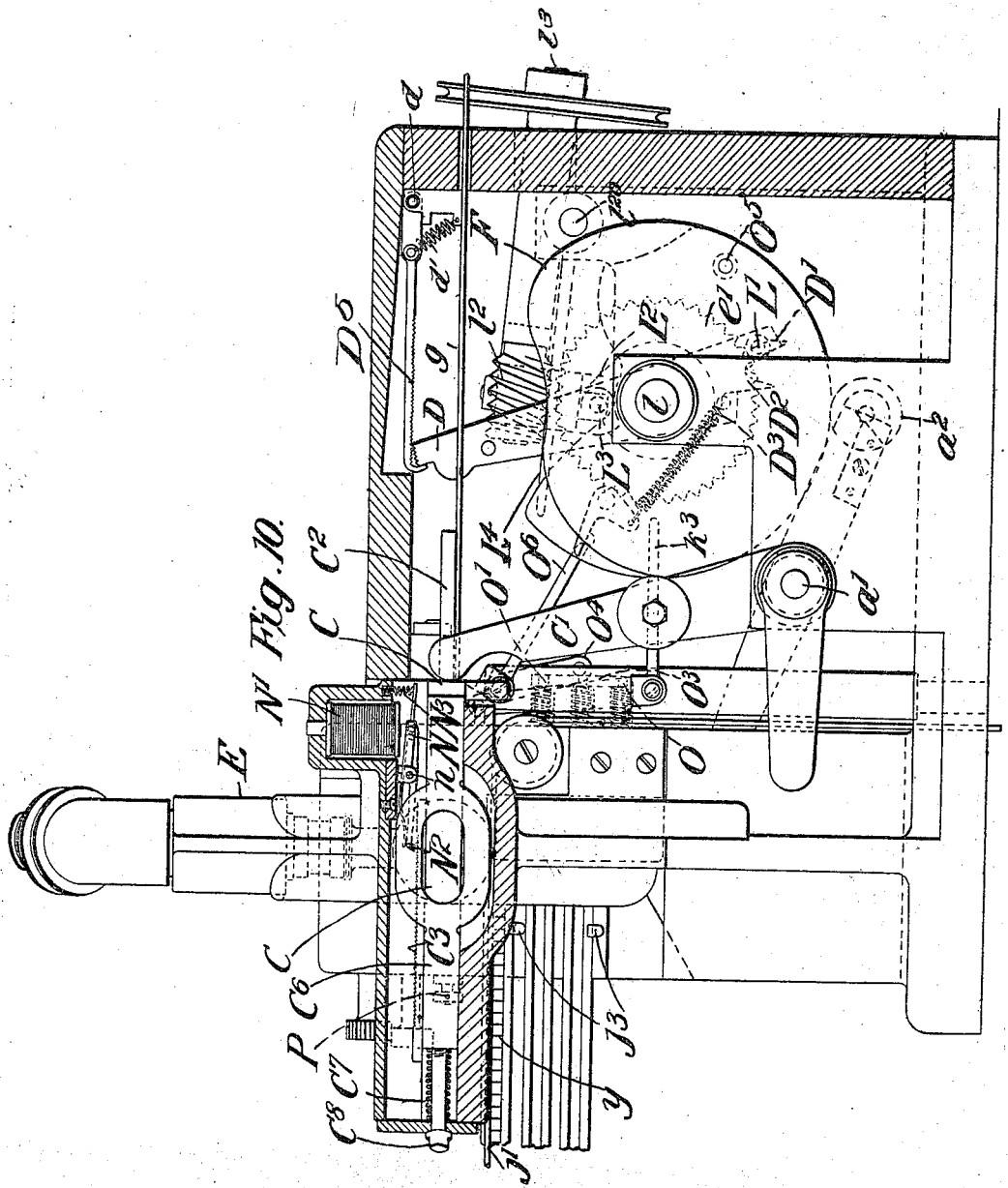

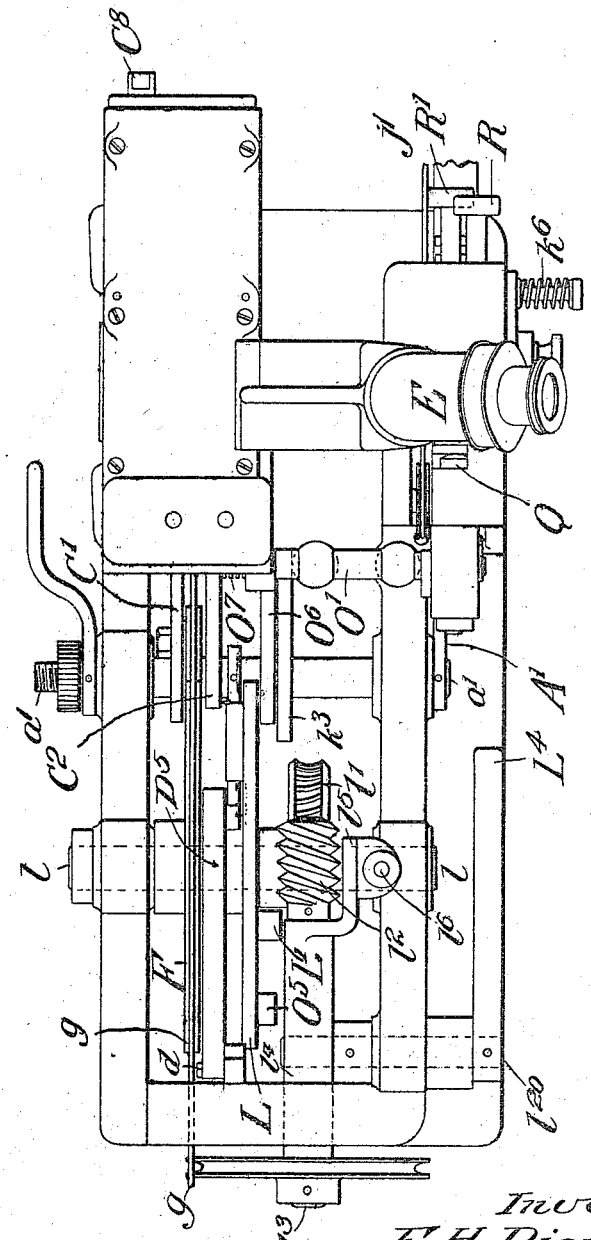

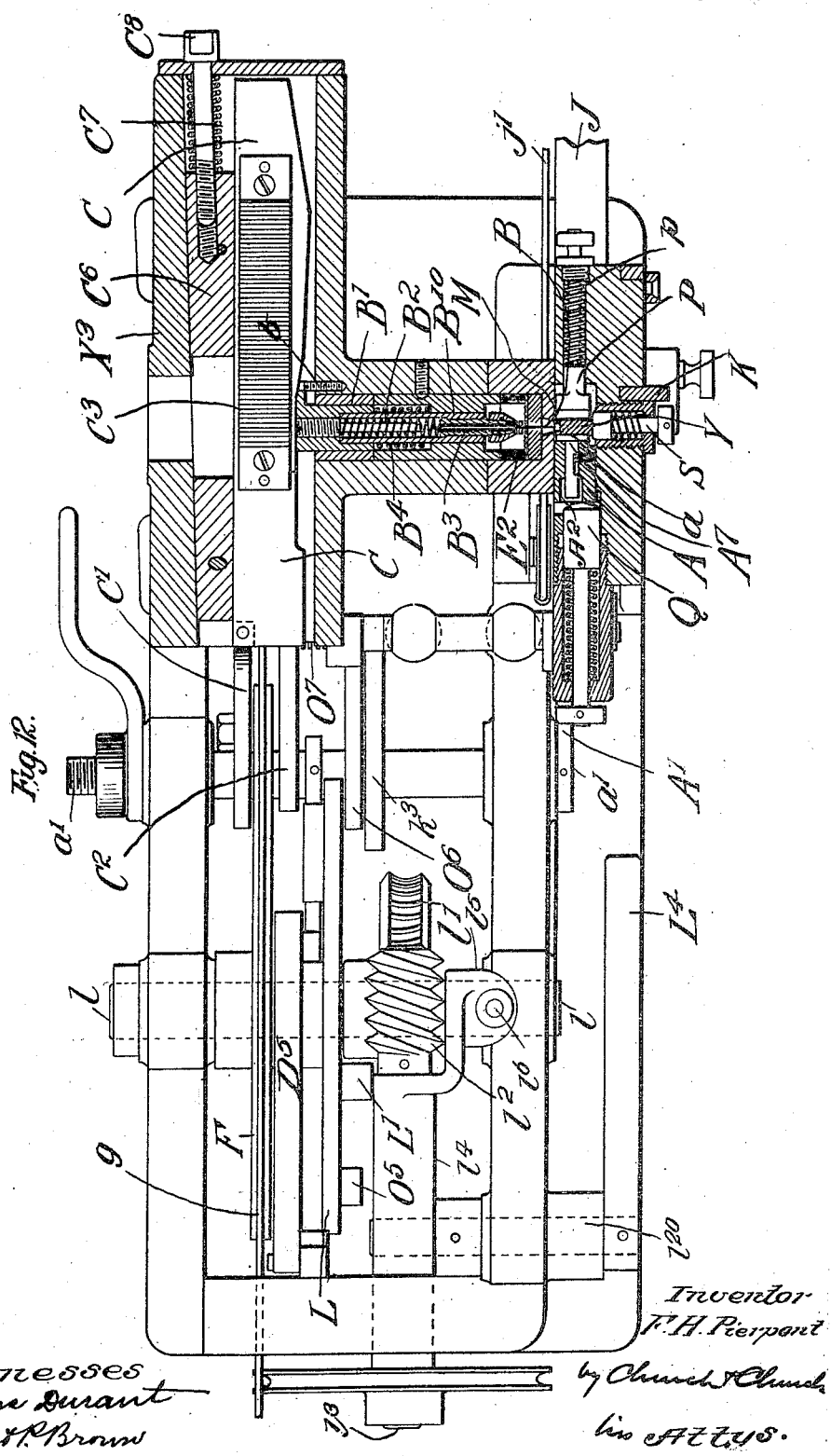

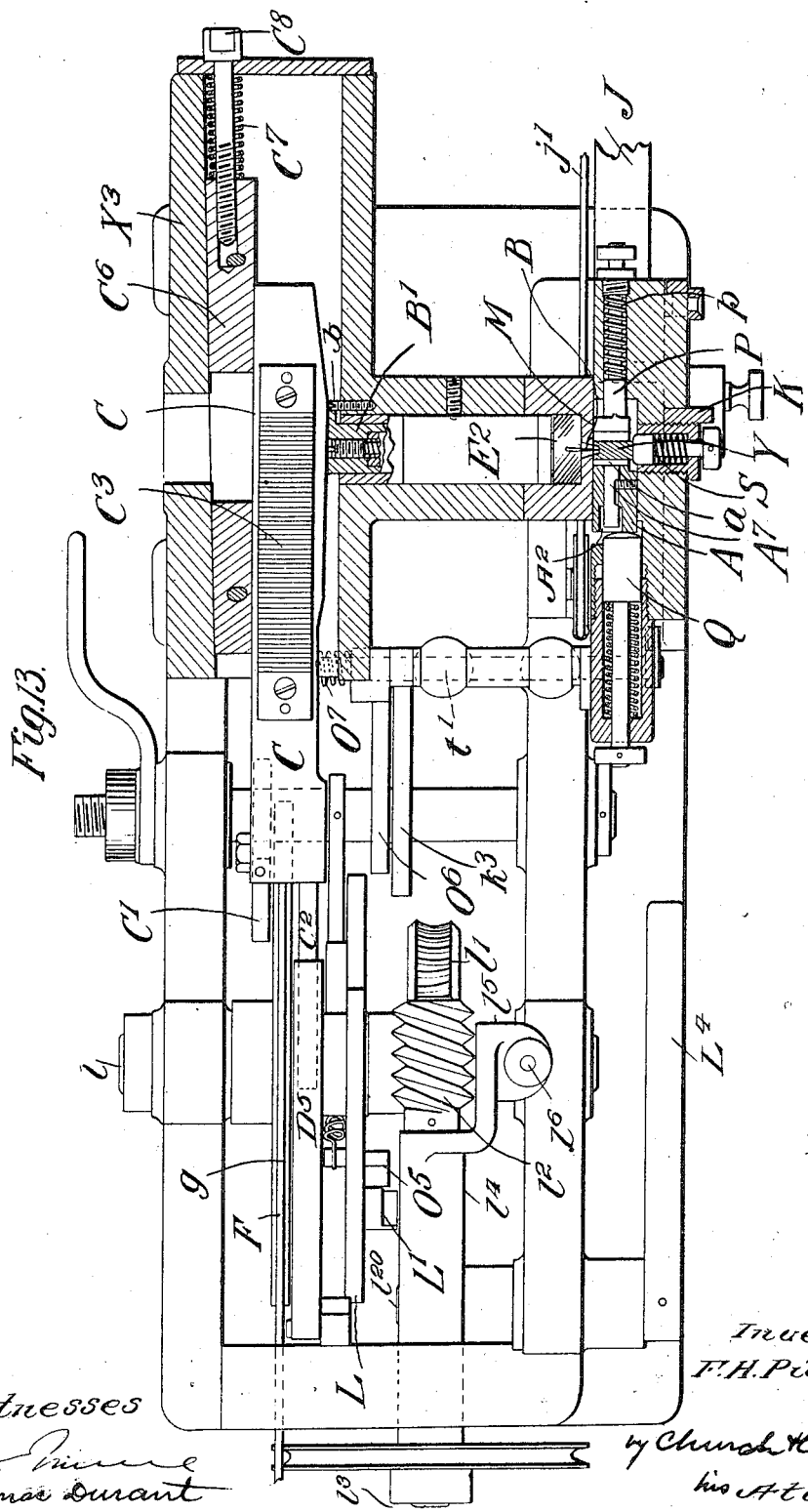

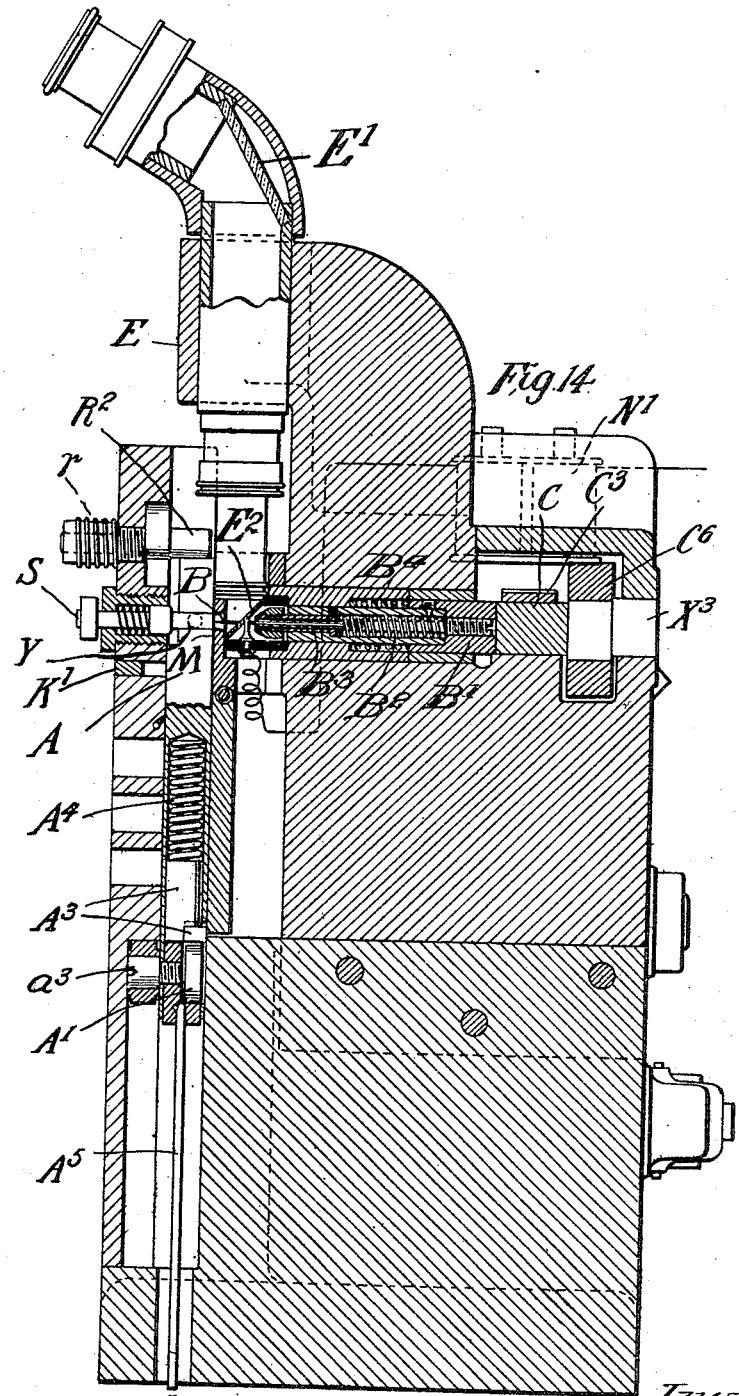

F. H. PIERPONT.
MATRIX GAGING AND SORTING MACHINE.
APPLICATION FILED APR. 11, 1911.

1,149,284.

Patented Aug. 10, 1915.
15 SHEETS—SHEET 14.

Witnesses

Inventor
F. H. Pierpont
by Church & Church
his Attys.

F. H. PIERPONT.
MATRIX GAGING AND SORTING MACHINE.
APPLICATION FILED APR. 11, 1911.

1,149,284.

Patented Aug. 10, 1915.
15 SHEETS—SHEET 15.

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

MATRIX GAGING AND SORTING MACHINE.

1,149,284. Specification of Letters Patent. Patented Aug. 10, 1915.

Application filed April 11, 1911. Serial No. 620,392.

*To all whom it may concern:*

Be it known that I, FRANK HINMAN PIERPONT, a citizen of the United States, temporarily residing at Salfords, Horley, in the county of Surrey, England, have invented a certain new and useful Improvement in Matrix Gaging and Sorting Machines; and I do hereby declare the following to be a full, clear, and exact description of the same, reference being had to the accompanying drawings, forming a part of this specification, and to the figures and letters of reference marked thereon.

This invention relates to measuring or gaging, or measuring or gaging and separating or sorting instruments or apparatus, and refers particularly to those for measuring differences or variations in height or altitude in the surface of a body or article, or the depth of depressions therein.

The chief object of the invention is to provide an accurate and reliable apparatus or instrument wherein the bodies or articles are conveyed singly by an automatically movable carrier to a measuring or gaging mechanism by which the measurement or gaging, above referred to, is accurately and automatically performed, and the measuring mechanism, in performing its operation, automatically renders operative or energizes mechanism which by controlling the extent of the return movement of the carrier effects the separation of bodies conforming to a predetermined standard from those varying therefrom and also the separation of bodies which do not conform to the standard in one direction from those that do not conform thereto in another direction.

In an instrument or apparatus organized in accordance with the present invention, the bodies or articles are automatically delivered one at a time, by appropriate feeding or transferring mechanism or pushers, to a carrier which is moved from a receiving position to convey the body or article to a position opposite a gaging or measuring device, and is then automatically stopped to permit the body to be finally positioned, if necessary, whereafter the machine is again started and the measuring or gaging device advances to engage one surface or part of the surface of the body and the extent of movement permitted to the gaging device in performing the measuring operation controls the operation and positioning of mechanism which determines the extent of the carrier's return movement, after which the body is automatically delivered from the carrier.

The measuring device is in the form of a needle which is automatically advanced by a movable wedge-shaped or tapering member and the extent of movement allowed to this wedge member depends upon the measurement effected by the needle, mechanism being automatically operated by the needle to stop or lock the wedge-shaped member which in turn controls the positioning of the stop mechanism limiting the return movement of the carrier.

The wedge shaped member is controlled in one direction by a cam or its equivalent and in the other by a spring or weight and when it has moved the requisite amount it is locked in position by the mechanism controlled automatically by the measuring needle. Conveniently the needle controls the closing of an electric circuit the closing of which operates the locking member.

Conveniently the stop mechanism effects the stopping of the carrier in any one of three possible positions, one where the difference between the two surfaces being measured of the body is normal, another where the difference is less than standard and a third where the difference is greater than standard.

The body in the carrier after the latter is brought to the measuring position, is finally positioned by hand, if necessary, before the needle advances, and a part of the body forming one of the surfaces taking part in the measurement can be observed by the operator through a microscope or the like to insure that the body is accurately positioned before the measuring needle advances.

Figure 2:
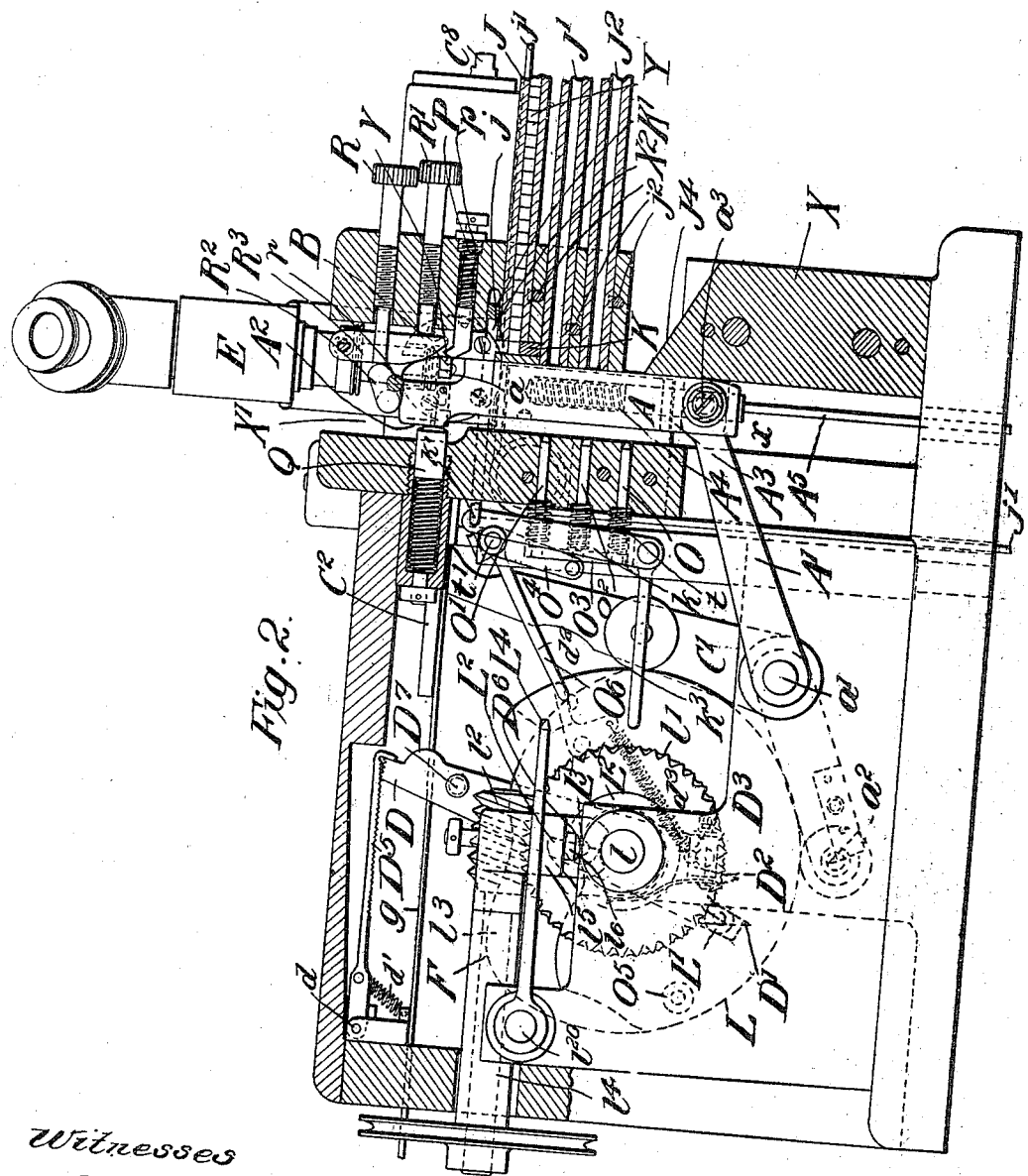
Figure 3:
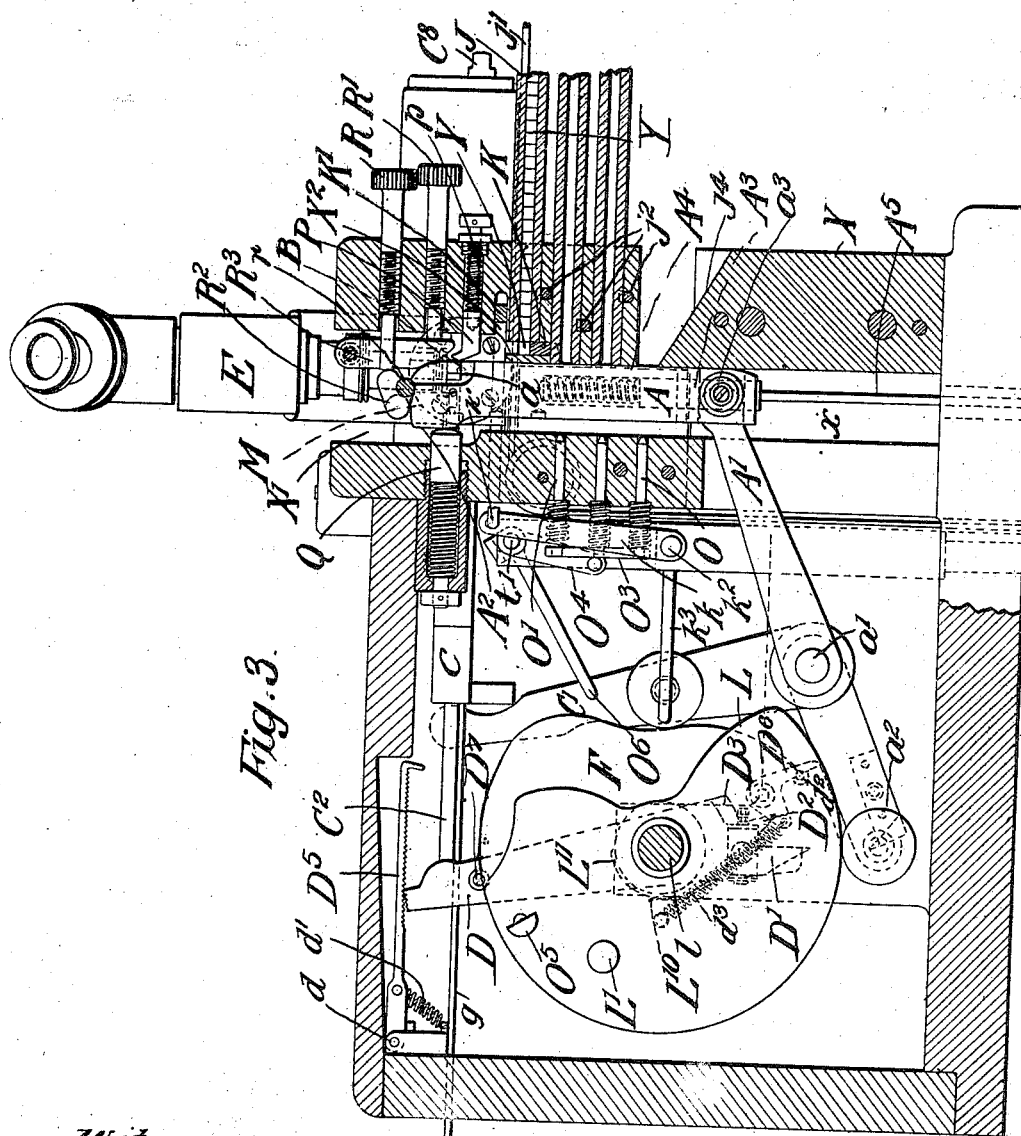
Figure 4:
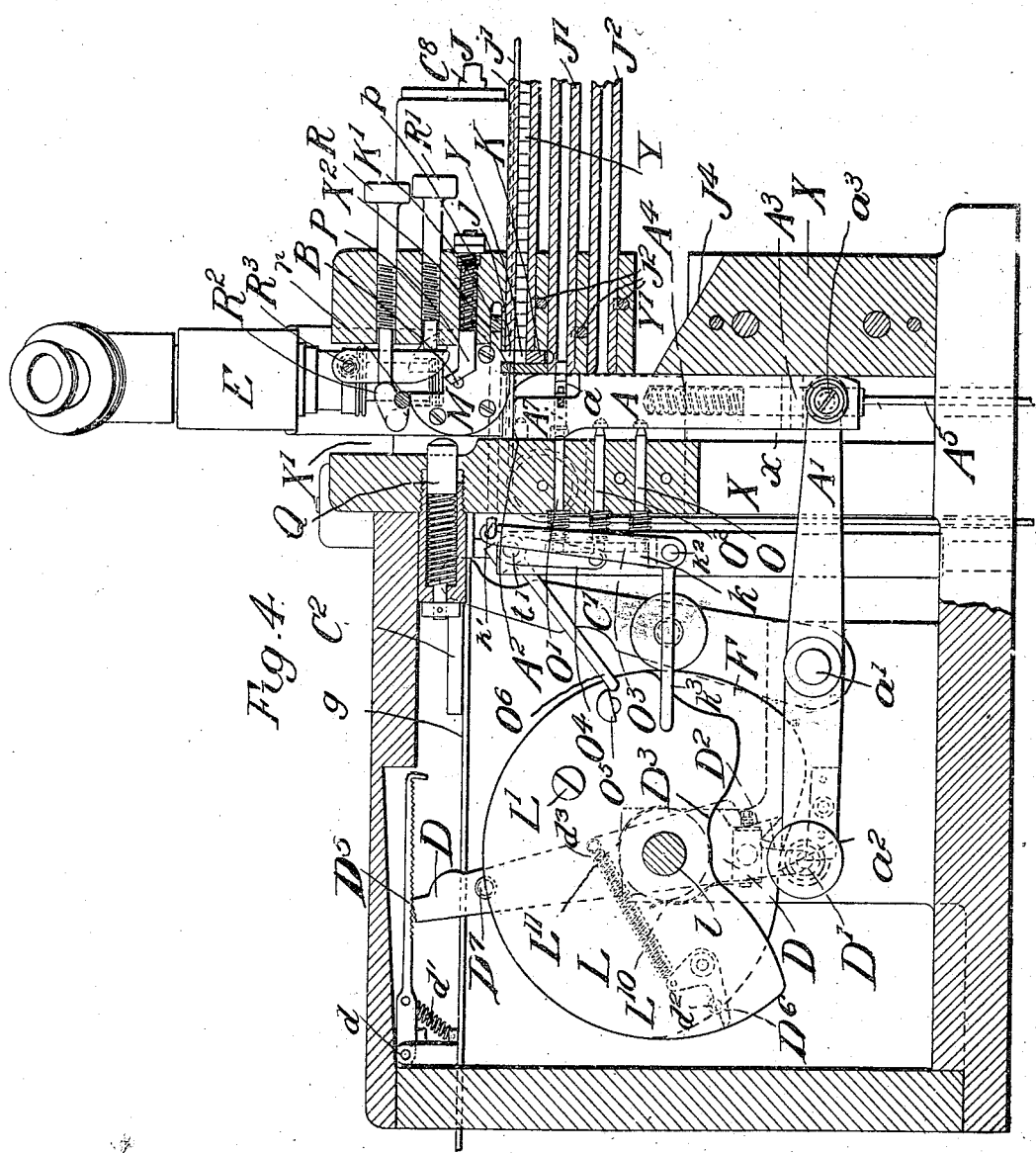
Figure 5:
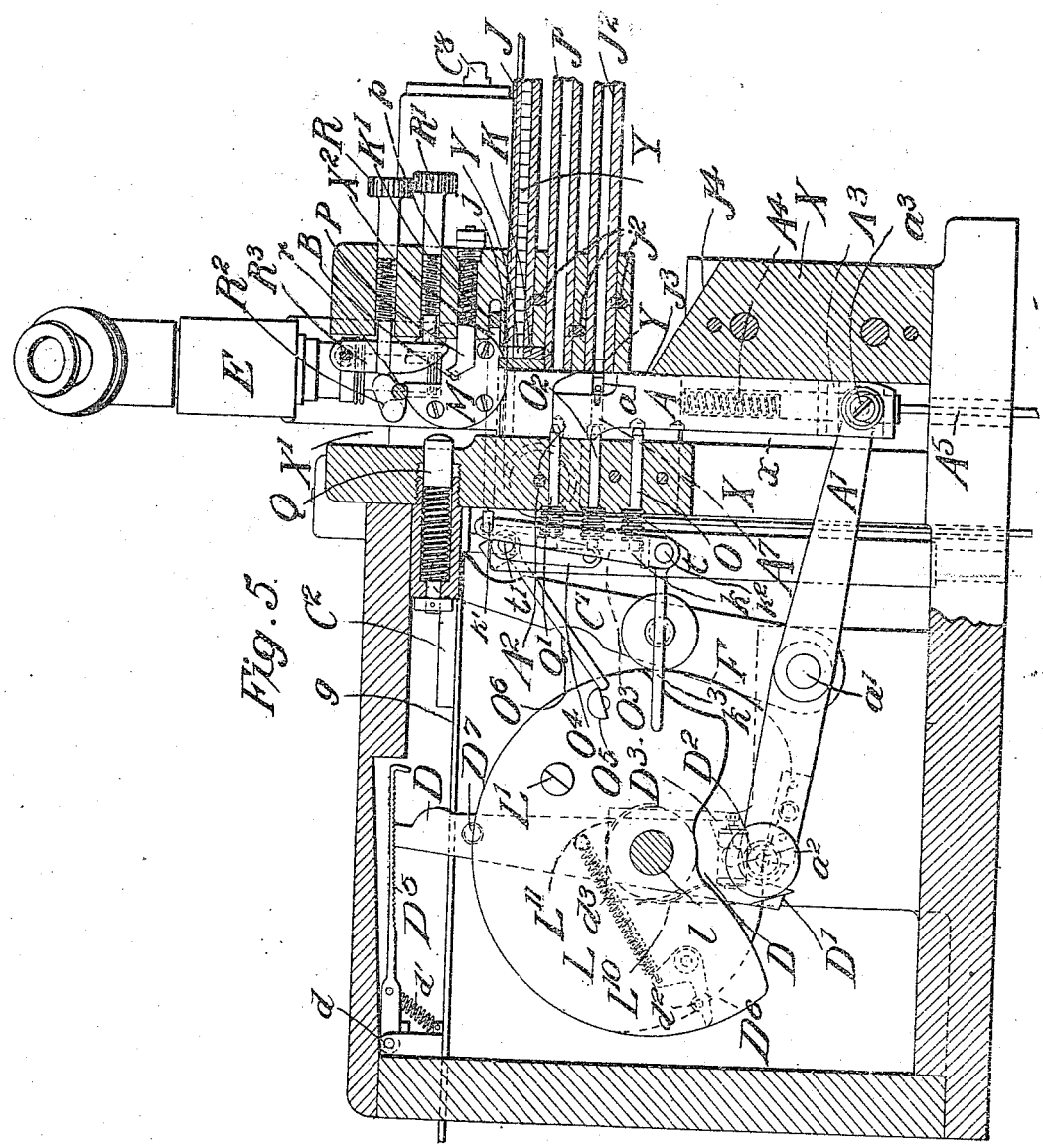
Figure 6:
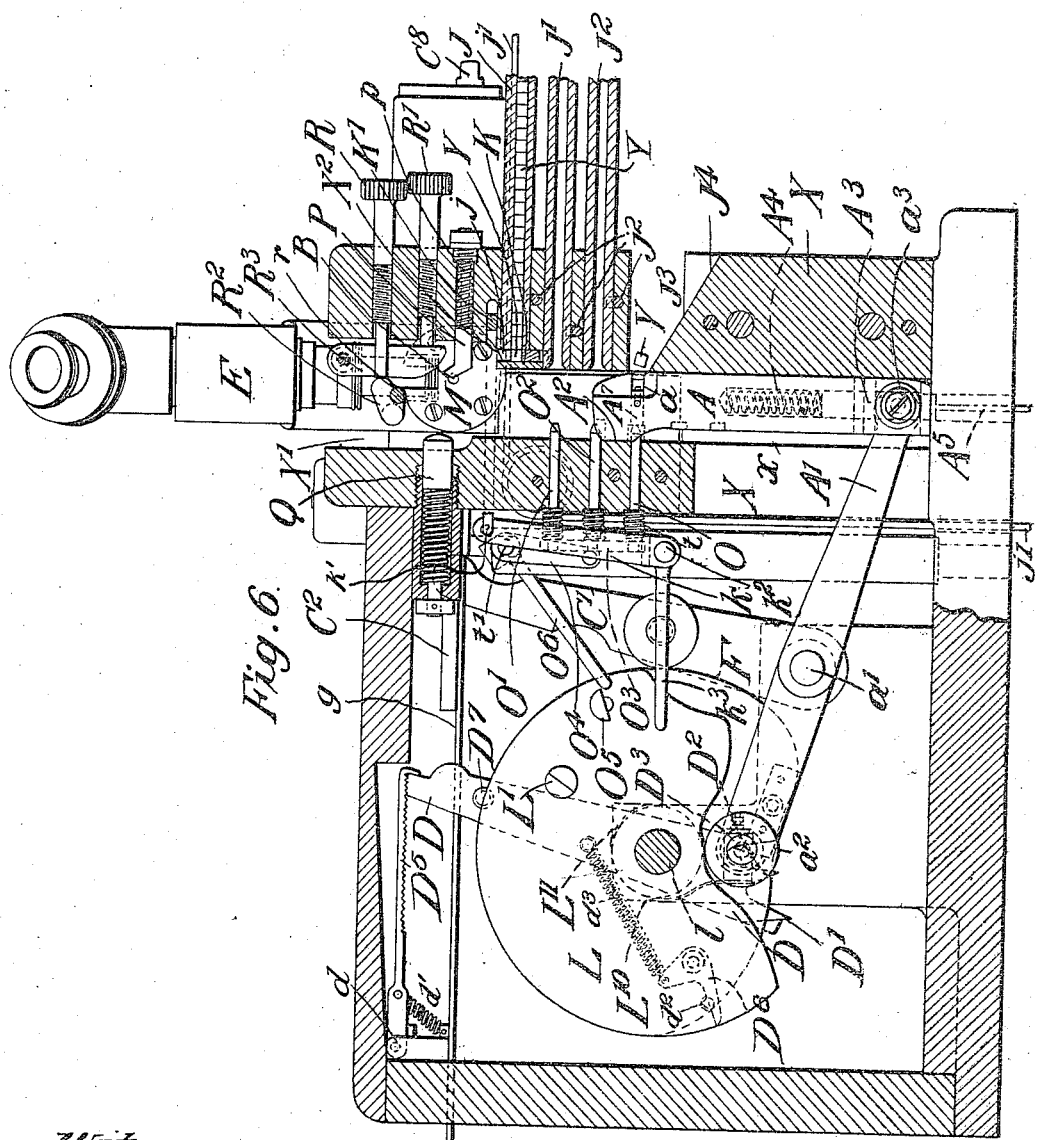
Figure 15:
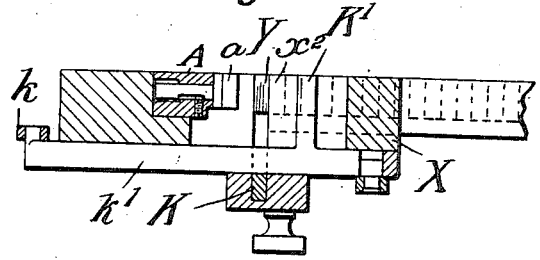
Figure 16:
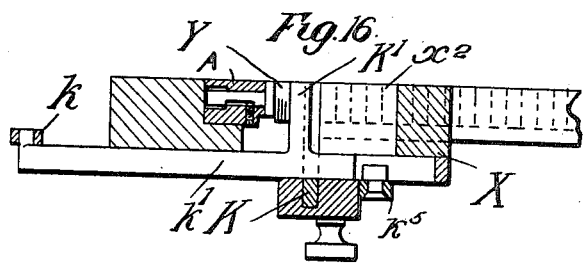
Figures 17, 18:
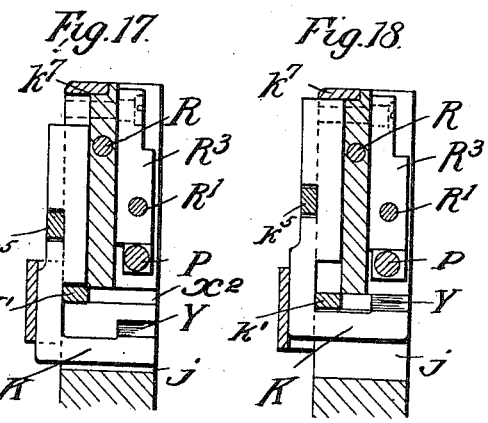
Figure 19:
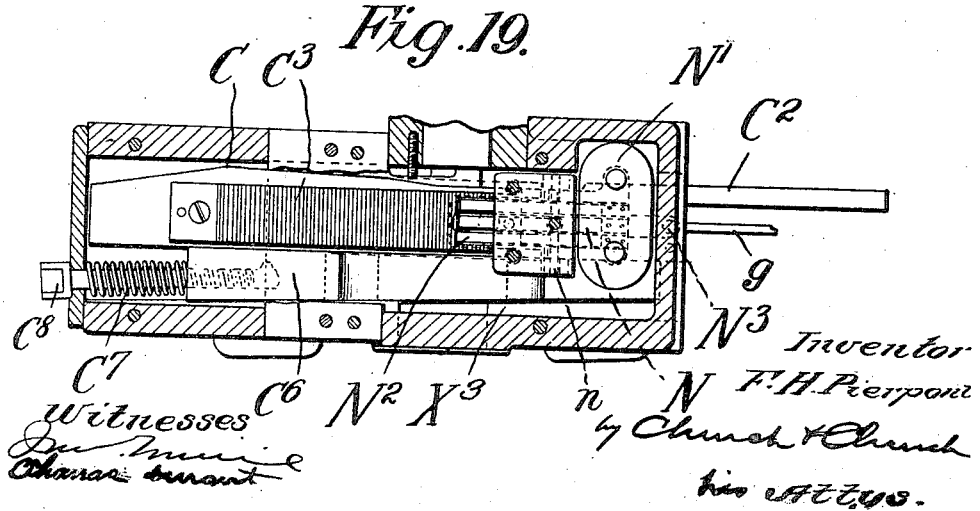
Figure 20:
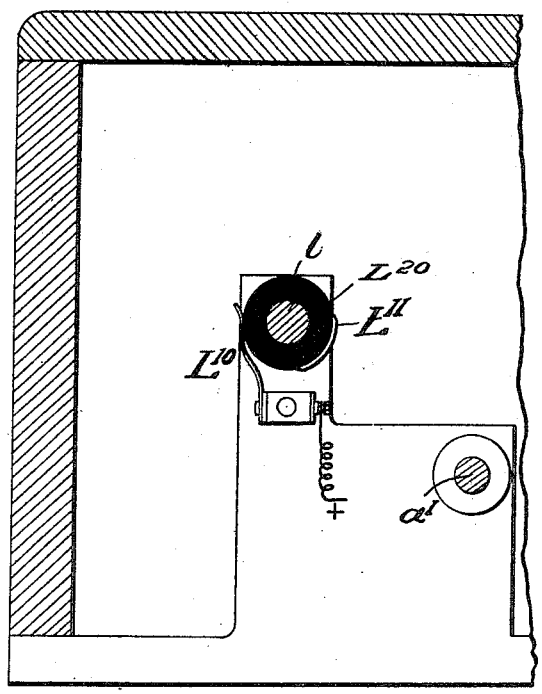

Referring to the drawings: Figure 1 is a front sectional elevation of an instrument or apparatus embodying the present invention, showing the carrier in the receiving position. Fig. 2 is a similar view showing the carrier with the body in measuring position. Fig. 3 is a similar view to Fig. 2, but showing the parts in the positions assumed after the measuring operation. Fig. 4 is a similar view showing the carrier in position to deliver a body wherein the difference between the measured surfaces is greater than normal. Fig. 5 is a similar view showing the carrier in position to deliver a body wherein the difference between the measured surfaces is normal. Fig. 6 is a similar view showing the carrier in position to deliver a body wherein the difference between the measured surfaces is less than normal. Fig. 7 is a front elevation partly in section of the apparatus shown in Figs. 1 to 6. Fig. 8 is an end elevation of Fig. 6 looking from the right hand end. Fig. 9 is a sectional elevation mainly on the line 9—9, of Fig. 1, but with one or two parts omitted for the sake of clearness. Fig. 10 is a rear elevation of the apparatus partly in section. Fig. 11 is a plan of the apparatus. Fig. 12 is a sectional plan, the section being taken through the measuring or gaging mechanism. Fig. 13 is another sectional plan. Fig. 14 is a vertical transverse section in the plane of the measuring needle. Fig. 15 is a horizontal section of the blank feeding mechanism taken above and in the plane of the pusher which delivers the blanks to the carrier. Fig. 16 is a similar view with the pusher advanced to seat the blank in the carrier. Fig. 17 is a vertical section of a part of the blank feeding mechanism taken in a plane to one side of and parallel with the transferrer which delivers the blank to the pusher, Fig. 15. Fig. 18 is a similar view with the transferred in elevated position sustaining a blank in front of the pusher. Fig. 19 is a top plan view partly in section of the needle adjusting mechanism. Fig. 20 is a detail view showing the circuit closer and interrupter.

A is the carrier; B the measuring device or needle; C the wedge-shaped member controlled by the needle B; D is the stop coöperating with the member C to control the extent of the return movement of the carrier; and E is the microscope.

The carrier A is mounted to move vertically in a guide way or channel $x$ in the machine body X, and is provided at or near its upper end with a seat or socket $a$ for the body to be measured. The lower end of the carrier rests on one end of an actuating lever A′ which is pivoted at $a′$ and at its upper end the carrier has an offset or shoulder $A^2$ (see Figs. 1 to 6) which during a portion of the travel of the carrier bears against the side wall of the channel, but which when the carrier is in the measuring position (see Fig. 3) enters or coincides with a recessed or cut-away part X′ of the frame to allow the carrier to turn pivotally on the spindle of a roll $a^3$ mounted at the lower end of the carrier to run in a groove in the channel $x$ (see Fig. 14). This is to permit of a lateral movement of the carrier to finally position the body, if necessary, relatively to the measuring device, as hereinafter described. The end of the lever A′ rests against a block $A^3$ (see Fig. 14) let into the carrier A and pressed downward by a spring $A^4$ to permit of relative movement between the carrier A and lever A′ as hereinafter described. Block $A^3$ is formed with a cylindrical shank movable in a socket in carrier A and is provided with a lateral extension projecting above lever A′ as clearly shown in Fig. 14. A cord $A^5$ attached to a weight $A^6$ constantly tends to pull the carrier downward and the carrier is raised by a cam L acting upon the other end of lever A′ which is provided with a roll $a^2$.

The bodies or articles to be measured are placed in a galley or container J toward the outlet end of which they are constantly pressed by a follower connected by a cord $j′$ to a weight (not shown) and acting on the rear end of the column of bodies in the container in a well-known manner.

During a portion of the cycle of operations, the outlet end of the container J is closed by a block K (see Fig. 1) which also acts as a transferrer. When the block K, which is adapted to move up and down in a channel $j$ at the outlet end of the galley, is lowered (see Figs. 2 and 17) the leading body Y of the column enters the channel $j$ above the block K which latter in rising lifts the body to the level of the channel $X^2$ in the machine frame and again closes the outlet of the container.

Working in the channel $X^2$ is a pusher K′, in front of which the body Y is placed by the transferrer K, and said pusher is advanced in timed relation to the movement of the transferrer K to feed the body Y into the seat $a$ in the carrier A.

The pusher K′ is formed on the end of a longitudinally movable rod $k′$ (see Figs. 15 and 16) which, at its outer end, is connected to one end of a lever $k$ (see Fig. 7) the other end of which is secured to a shaft $k^2$ carrying an arm $k^3$ projecting so as to be engaged periodically by a pin L′ on the cam L (see Fig. 1). Arm $K^3$ is loosely mounted on shaft $k^2$ and is connected thereto by a spring $k^4$, Fig. 9, one end whereof is fastened to the arm and the other to the shaft to form an elastic driving connection between said arm and shaft, one that will yield should the travel of pusher K′ be interfered with. Lever $k$ is retracted to normal position by a spring $k^8$ one end whereof is fastened to shaft $k^2$ and the other to the frame.

The transferrer K which is in the form of a bar or plate having a projecting arm for the reception of the body (see Figs. 17 and 18) is also operated from the pin L′ and rod $k′$ through a bell crank lever $k^5$ (see Fig. 7) one arm of which engages a slot in the member K, and the other is connected by a pin and slot connection with the rod $k′$. A spring $k^6$ (see Fig. 9) fast at one end on lever $k^5$ and at its other end attached to the fixed pivot pin constantly tends to turn the lever $k^5$ to raise the transferrer K but is prevented until the proper time, by said pin and slot connection the pin on the lever engaging the end wall of the slot in the rod $k'$. When the rod $k'$ moves forward the spring $k^6$ raises the transferrer K until the upper end of the latter contacts with a plate $k^7$ when the pusher K' will continue to advance until body, raised by the transferrer, is placed in the seat $a$ in the carrier.

After the body has been deposited in the seat $a$ by the transferrer K and pusher K', the carrier A is moved upward bodily from the receiving position (see Fig. 1) by the cam L until the body Y therein is opposite the point of the measuring needle B (see Fig. 2) when the mechanism controlling the travel of the carrier is thrown out of gear automatically and the carrier stopped as will hereinafter be explained.

The cam L is mounted upon a spindle $l$ which carries a worm $l'$ rotated by a worm $l^2$ that is carried on a shaft $l^3$. The shaft $l^3$ is driven by cord or other appropriate gearing and is mounted in a pivoted frame or bearing $l^4$ fast on shaft $l^{20}$ and can be turned to engage and disengage the worm $l^2$ and wheel $l'$. Mounted upon the shaft $l$ is a cam $L^2$ conveniently formed as a face cam or cam slot in one side of the worm wheel $l'$ and with this cam slot engages a pin $L^3$ carried by a boss $l^5$ on the bearing $l^4$. A spring shown in Fig. 1 is interposed between a pin $l^6$ and the boss and is in compression when the worm and wheel are in mesh. When the machine is started by the lowering of the hand-operated lever $L^4$ fast on shaft $l^{20}$ to engage the worm and worm-wheel, the pin $L^3$ is moved from its outer position in the widened portion of the slot down into and travels around the concentric part of the slot $L^2$ until near the end of a revolution, when pin $L^3$ is again forced up into the higher part of the cam slot (see Fig. 2) through the action of the spring on pin $l^6$ the latter engaging the machine frame (see Figs. 1, 2, and 7) to raise the worm out of gear with the worm-wheel. This upward movement and disengagement of the worm and worm wheel takes place when the carrier has been raised to the measuring position and the pin $L^3$ engaging with the shoulder joining the high and low parts of the cam slot, stops rotation of the driving wheel. This stopping of the machine when the carrier has brought the body to the measuring position allows a lateral adjustment of the body relatively to the measuring needle to be made by hand and under the visual control of the operator.

When the body is brought (as in Fig. 2) opposite the measuring needle B, it is prevented from moving laterally in the seat in the carrier by a bolt P mounted in the machine frame and constantly pressed against the side of the body by a spring $p$, and the end of the body in which is the cavity or variation, the depth or extent of which is to be measured, is pressed against a gaging plate or stop M (Figs. 12, 13 and 14) which is slotted or bored for the passage of the needle. The needle B, which is adapted to enter the cavity or engage a part of the surface not in contact with the plate M, is advanced by the longitudinal movement of the wedge member C to which is connected, by a cord $g$ (see Fig. 12) a weight (not shown). The weight is prevented from moving the member C prematurely by the cam F which, hitherto, has been pressing a lever C' upon the end of the wedge member C. The cam F, in rotating, now recedes and allows the weight to move the wedge member C until the wedge-shaped edge thereof (see Figs. 12, 13 and 19) acting on the block B' in which the needle B, is mounted, presses the point of the latter into the cavity in the body or against part of the surface of the body as shown in Fig. 13.

The block B' carrying needle B is formed or provided with a tubular extension $B^{10}$ for the reception of the holder $B^3$, the latter provided with a sleeve of insulating material surrounding the needle. The inner end of holder $B^3$ is provided with a shoulder and is held in yielding contact with a shoulder in extension $B^{10}$ by a spring $B^2$ located within said extension. The block B' is furnished with a beveled or inclined part to engage the inclined surfaces of the member C and is held from rotating by a screw $b$. A spring $B^4$ surrounding the forward part of the block B' serves to return the latter and the needle when the member C is moved back to normal position.

When the point of the needle touches the surface it is intended to contact with, it closes an electric circuit hitherto open and the closing of this circuit energizes an electro-magnet N' (see Fig. 10) which attracts the locking lever N. The locking lever N comprises three or more parts all of which are pivoted at $n$ and carry at their free ends teeth $N^2$ adapted to engage teeth $C^3$ on the wedge member C when the locking block is advanced, thereby holding the member C against further movement under the action of the weight. The parts of the lever N are of slightly different lengths so that one or other of them will engage the teeth on the member C however slight the movement thereof may be without the necessity of providing very fine teeth on the member C. At their other ends the members of the levers N are each furnished with a spring $N^3$ which effects the disengagement of the teeth $C^3$ $N^2$ when the circuit is broken.

There is a second gap in the electric circuit controlled by a wiper $L^{10}$ adapted to engage contact $L^{11}$ mounted on an insulating collar $L^{20}$ but connected to the shaft of the worm wheel, as by the pin shown in Fig. 20 and these two are only in contact shortly in advance of the movement of the needle and during the time the needle takes to make its longest travel.

The rear side of the member C bears against a wedge $C^6$ which in turn bears upon an incline $X^3$ on the machine frame, and the wedge $C^6$ is constantly pressed forward by a spring $C^7$ and can be withdrawn to adjust the member C by a screw $C^8$.

A rod $C^2$ on the end of the member C during the movement of the member, bears upon the end of the pivoted stop member D causing that member to turn on its pivot. At its lower end the stop D is provided with projections $D'$, $D^2$, $D^3$ (see Figs. 5, 6 and 7) situated at different levels and adapted to be interposed in the path of the lever $A'$ so that the extent of movement of the lever $A'$ and consequently of the carrier A, is dependent upon which of the three stops is interposed, and this interposition is controlled in turn by the extent of movement of the member C due to the depth of the cavity in the body as measured by the needle B.

When the pivoted stop lever D has been moved by the rod $C^2$, it is held against return movement by a frictional device or catch. In the present embodiment the lever has its upper end roughened (see Figs. 1 to 4) so as to engage a roughened surface on the proximate face of a lever $D^5$ pivoted at $d$ and pulled into engagement with the lever D by a spring $d'$.

When the body is in the measuring position the surface or surfaces thereof taking part in the measurement is or are under the observation (see Figs. 11, 12, 13 and 14) of the operator through the microscope which is provided with the usual ocular, and with reflectors $E'$ and $E^2$, the latter mounted at suitable angles to one another and to the surface of the body to be measured. The reflector $E^2$ is pierced for the passage of the needle but this does not interfere with the clearness of the operator's vision. The surface of the body facing the reflector $E^2$ is reflected therefrom on to the reflector $E'$, and the operator can manipulate screws R, $R'$ (see Figs. 1 to 6) which bear upon the carrier when the latter is in the measuring position, so as to move the carrier either vertically or horizontally to bring the necessary part of the body opposite the point of the needle. The body during the measuring operation is pressed against the plate M by a spring-controlled pin S acting on the rear end of the body (see Figs. 12 and 13).

Should the depth of the cavity in the body Y be normal, then the forward movement of the needle will be such that the member C will move member D to an extent sufficient to present the stop $D^2$ in the path of the end of the lever $A'$ and the downward movement of the carrier will be such as to place the seat $a$ in the carrier opposite or in line with the receiver $J^2$ for standard bodies (see Fig. 5).

When the carrier has reached this position an ejector $O^2$ is advanced to engage a rod or sliding piece $A^7$ in the carrier and eject the body Y from the seat $a$ and into the receiver $J^2$.

As clearly indicated in Figs. 4, 12 and 13, sliding piece $A^7$ forms the rear wall of the seat $a$ and projects through an opening in the carrier in position to be engaged by any one of the ejectors at the time in register therewith. The movement of sliding piece $A^7$ in the carrier is limited by appropriate means, such as a screw projecting into a slotted portion, and the main purpose of interposing said sliding piece between the contained blank and the ejectors is to limit the stroke of the latter in effecting a displacement and discharge of the blank.

There are three ejectors O, $O'$, $O^2$, provided, one in line with the seat $a$ for each of the stopping places of the carrier, and conveniently they are all operated from the same source, provision being made for the prevention of damage by the idle advance of two of the ejectors.

The ejectors are mounted to slide in the machine frame and are held in their withdrawn position by springs $t$. At their outer ends, the ejectors are connected to a plate $O^3$ (see Figs. 1, 6 and 9) to which is pivotally attached one end of a lever $O^4$ secured to a shaft $t'$. On the other end of the shaft is mounted an arm $O^6$ projecting into the path of a pin $O^5$ mounted on the side of the cam L (see Fig. 6). Between the arm $O^6$ and the shaft $t'$ is disposed a spring $O^7$ forming a yielding connection to allow the pin $O^5$ to continue its travel if the movement of one or other of the ejectors is obstructed. On the side of the carrier proximate to the ejectors are formed recesses into which enter the ejectors which for the time being do not register with the seat $a$.

The lever D is returned by a projection $D^6$ moving in company with the cams F and L, the projection $D^6$ is conveniently pivoted to one of the cams and is held against a stop $d^2$ by a spring $d^3$. The stop $D^6$ is adapted to engage a stud $D^7$ on the lever D and when this lever buts against the rod $C^2$ the projection $D^6$ turns on its pivot to overrun the stud $D^7$. The friction due to the engagement of the roughened surfaces on the levers D and $D^5$ is only sufficient to hold the lever in place when free, but does not interfere with movement of the lever by the rod $C^2$ or stop $D^6$.

Should the depth of the cavity in the body Y be greater than normal, the movement imparted to the lever D by the wedge member C will be such as to interpose the stop D' in the path of the lever A' and the carrier will descend only far enough to bring the seat $a$ in line with the receiver J', and the ejector O' will effect the discharge of the body Y from the seat $a$ into that receiver (see Fig. 4).

When the depth of the cavity is less than normal the lever D will be moved to interpose the stop D³ in the path of the lever A' and the carrier will descend until the seat $a$ is opposite an orifice J³ and the ejector will effect the discharge of the body Y which is allowed to fall as shown in Fig. 6 on to a chute J⁴ and thence to a receptacle at the base of the machine.

The frame is grooved for the reception of the galleys or containers J J' and J² each of which latter is detachably secured in its groove or seat by the engagement of the L shape head $j^3$ of a bolt $j^2$, the latter passing through the frame and having its outer or threaded end engaged by a nut $j^4$ as clearly indicated in Figs. 6, 7 and 8.

When the carrier is raised by the cam L to the measuring position the part of the body which is to be measured is visible to the operator, being under the microscope E and to enable the operator to adjust or finally position the body, mechanism is provided for moving the body vertically and horizontally. Conveniently the whole carrier is moved by the adjusting mechanism. In the measuring position the shoulder A² on the carrier is clear of the shoulder on the machine but the carrier is prevented from turning upon the pivot at its lower end by a spring-controlled pin Q mounted upon the machine frame so that one of its ends presses upon one side of the carrier. A short distance above the carrier is mounted a bell crank lever R², pivoted at $r$ one arm of which bears upon the carrier when the latter is in the measuring position. Arranged to bear upon the other arm of the lever is an adjustable screw R, by turning which in one direction the lever R' is caused to depress the carrier against the action of the spring, and by turning this screw in the opposite direction the spring A⁴ is permitted to raise the carrier.

A second screw R' is mounted in the machine frame a short distance below the screw R and its inner end bears upon a pivoted lever R³, so that when the screw is advanced, the lever R³ moves the carrier on its pivotal support and forces it against the bolt Q which yields and permits the body in the carrier to be accurately positioned horizontally. On the screw being retracted the spring-controlled bolt Q advances the carrier.

In Figs. 2 and 3 the carrier is shown in its raised position but has not been adjusted by either the screw R or R' to finally position the body, but in Figs. 12, 13 and 14 the final adjustment has been made and the cavity is shown in line with the needle in Figs. 12 and 14, and in Fig. 13, the needle has advanced into the cavity in the body.

This invention refers generically to gaging or measuring apparatus or instruments or to measuring or gaging and separating or sorting instruments, and in the embodiment above described it is shown applied to an apparatus for treating type matrices or like bodies of parallelepiped form and of square or oblong cross section, but the invention is not restricted to such machine as it can be applied equally well to other machines.

As hereinbefore indicated the present invention is illustrated in a specialized form adapted for applying a depth test to type matrices and their subsequent distribution into separate classes. The datum line with relation to which the measurements are performed is furnished by surface M against which the end or face of the matrix containing the cavity is firmly pressed, and the admeasuring member is one adapted to enter the matrix cavity and contact with the surface upon which the printing face of the type is formed.

As is well known matrices of this kind are applied to the face of the mold in which the body of the type is cast, and the depth of the cavity determines the length of the type or as it is termed the "height to paper."

If the matrices acted upon were of the same character and dimensions a single setting or adjustment of the machine would suffice for all; but inasmuch as the machine is designed to operate upon matrices containing different characters it is necessary from time to time to readjust the relation of the admeasuring member to the matrix in order that the former may be positioned to enter the cavity and contact with the printing face of the character. It is for this reason, and to enable the adjustments to be made before the measuring operation is begun, that means are provided for automatically disconnecting the driver and bringing the mechanism to rest at a given point in each complete cycle. In the present instance this uncoupling operation is accomplished through the medium of spring actuated pin $l^6$ acting in conjunction with cam groove L³ and driving member $l^2$ and it is performed at that period in the cycle when carrier A stands with its seat or socket $a$ in register with needle B and the contained matrix in contact with surface M. At this time pin L³ engages the outer wall of the enlarged portion of cam groove L² behind the shoulder therein; driving worm $l^2$ is separated from the worm wheel on cam shaft $l$; carrier A is maintained in the advanced position in contact with adjusting members $r$, $R^2$; wedge C is held in retracted position by cam F and stop D occupies the advanced position to which it has been carried by projection $D^6$, all as indicated in Fig. 7. At this time the operator by means of the microscope observes if the matrix is presented in proper relation to the needle, and if he finds it is not he proceeds to adjust the position of the carrier through the manipulation of either or both screws R, R'. For convenience of description this may be regarded as the starting point for the cycle of operation. Pressure is applied to lever $L^4$, to couple up the driving mechanism (Fig. 2) so that motion is communicated to shaft $l$, causing pin $L^3$ to enter the concentric portion of cam groove $L^2$, and thereby maintaining the machine in motion during one complete rotation of shaft $l$ or until the widened portion of the cam groove arrives opposite pin $L^3$ and frame $l^4$ is permitted to move, and in so doing uncouple the driving mechanism.

The first motion of shaft $l$ releases wedge C and permits it to move to the left (Figs. 7 and 12) thereby advancing needle B until its point contacts with the bottom of the matrix cavity. The instant this takes place magnet N' is energized and pawls $N^2$ engage the wedge to retain it temporarily in adjusted position corresponding with the degree of advance of needle B and the depth of the cavity.

The advance of wedge C under the action of its impelling weight displaces stop D to present one or another of its graded stop members D' $D^2$ $D^3$ in the path of lever A' connected to carrier A, so that when the latter, through the action of cam L, is permitted to retract or descend it will be arrested with its seat $a$ opposite one of the galleys $J^2$ or J', or chute $J^4$. As organized intermediate stop $D^2$ is selected to designate matrices whose depth of cavity is within the permissible limits of tolerance, hence if the cavity is too shallow the lesser advance of wedge C will effect a presentation of stop $D^3$ and the location of seat $a$ opposite chute $J^4$, as in Fig. 6; if correct the median advance of the wedge will present stop $D^2$ and bring seat $a$ opposite galley $J^2$, as in Fig. 5; and the greater advance of wedge C will present stop D' and arrest the carrier in register with galley J' as in Fig. 4.

Stop D is held in adjusted position by its retainer $D^5$ and wedge C is retracted by cam F prior to the descent of carrier A into engagement with stop D, D', or $D^2$, as the case may be, and while said engagement continues, lever $O^3$ is operated upon by pin $O^5$ to advance the ejectors O, O', $O^2$, the one at the time opposite seat $a$ acting to discharge the contained matrix as in Figs. 4, 5 and 6.

By the continued rotation of shaft $l$, cam L operates to elevate or advance carrier A until the seat $a$ registers with channel $X^2$, as in Fig. 1 and said carrier is temporarily retained in this position while pin L' is acting to successively advance pushers K and K' thereby effecting the transfer of a fresh blank or matrix from galley J to seat $a$. Thereafter carrier A is further advanced into contact with the gages to position the matrix opposite the admeasuring member or needle B, stop D is returned to initial position by projection $D^6$, and the wider portion of cam groove $L^2$ arriving opposite pin $L^3$ the latter together with frame $l^4$ is again elevated by spring pin $l^6$, to disconnect the driving devices and at the same time arrest driven shaft $l$ and the machine as a whole, and present a new matrix in position for observation and measurement, thereby completing the cycle.

Having thus described my invention what I claim is:—

1. A gaging and sorting apparatus including in combination the following elements, to wit; a reciprocatory carrier provided with a seat in which the body or blank is held during measurement; a plurality of separate receiving stations for the blank after measurement; means for moving the carrier from a receiving position to and arresting the same at the measuring position, and for moving the carrier from the latter position to one of the series of receiving stations and thence back to the receiving position; a movable measuring mechanism; selective mechanism controlled by the measuring mechanism and operating to determine the stopping place of the carrier relatively to the receiving stations; means for adjusting the blank in the measuring position; and means for automatically timing the relative movements of the carrier, measuring and carrier positioning devices.

2. A gaging and sorting apparatus including, in combination, the following elements, to wit; a measuring mechanism comprising a gage plate or stop and a movable needle; a sliding member for advancing the needle; a movable carrier; means for reciprocating the carrier; a stop member positioned by said sliding member to determine the return position of the carrier; a locking piece for said sliding member controlled by the needle; mechanism for inserting a blank in the carrier; mechanism for delivering a blank from the carrier; means for adjusting the position of the carrier at the measuring position; a miscroscope supported in position to control a view of the matrix cavity when in contact with the gaging surface; and automatic actuating devices for producing and controlling the movements of the needle, carrier, and blank inserting and delivery mechanisms in timed relation to one another.

3. A gaging and sorting apparatus including in combination the following elements, to wit; a measuring mechanism comprising a stationary plate having a gaging surface and a movable needle; a supply station; a plurality of receiving stations; a carrier; means for moving the carrier between the supply station, the measuring mechanism and the receiving stations; mechanism controlling the movement of the measuring needle; means controlled by said needle controlling mechanism, to determine the movement of the carrier and arrest the latter at one or the other of the receiving stations; feeding and transferring devices at the supply station for placing a blank in the carrier; pushers for ejecting the blank at the designated receiving station; a microscope at the measuring position; and automatically operating mechanism for actuating the said carrier, needle, controlling mechanism, feeding and transfer devices, and ejecting pushers in timed relation one to another.

4. A gaging and sorting apparatus provided with an automatic measuring mechanism, a reciprocatory carrier, means for advancing the carrier to the measuring mechanism, a stop mechanism for the carrier adapted to determine the motion of the carrier upon its withdrawal from the measuring position and means controlled by the measuring mechanism and in turn controlling said stop mechanism, and in combination therewith automatic actuating devices for the carrier advancing means, means for automatically arresting the machine with the carrier in measuring position, means for adjusting the carrier while in the measuring position and in relation thereto, means for starting up the machine and means to automatically retract the carrier to the member of the stop mechanism designated by the measuring mechanism.

5. In a gaging and sorting apparatus provided with a measuring mechanism and a reciprocating carrier, and in combination therewith, a support for the carrier, a yielding connection between the carrier and said support, graded stop devices for arresting the carrier at different points in its line of travel, an adjusting device for moving the carrier laterally, and yielding means acting on the carrier in opposition to the last named adjusting device to position the carrier in relation to the measuring mechanism.

6. In a gaging and sorting apparatus provided with measuring devices and a reciprocatory carrier adapted to receive and transfer bodies between the measuring devices, a supply station, and a plurality of delivery or receiving stations and in combination therewith a member provided with a plurality of graduated stops, a movable member controlled by the measuring devices to move said stop member and interpose one or the other of its stops in position to arrest the carrier.

7. In a gaging or sorting apparatus provided with measuring devices, and a reciprocatory carrier adapted to translate bodies between the measuring devices, a supply station and a plurality of receiving stations, and in combination therewith a stop member provided with a plurality of graduated stops, a movable member controlled by the measuring devices to move said stop member and present one or the other of its stops in position to arrest the carrier and a locking member for said movable member controlled by the measuring devices.

8. In a gaging and sorting apparatus, the combination with a measuring needle and a carrier, of a wedge shaped sliding member for effecting the movements of the needle and in turn controlled thereby a part coupled to and moving in unison with the carrier, and a lever provided with a series of stops and acted upon by the sliding member to interpose one or the other of its stops in the return path of said part moving in unison with the carrier.

9. In a gaging and sorting apparatus the combination with a measuring needle and a reciprocatory carrier provided with actuating means, of a reciprocatory wedge for effecting the movements of the needle and in turn controlled thereby, a stop carrying lever having a graduated series of stops acted upon by the wedge member to interpose one or the other of its series of graded stops in the return path of the carrier actuating means, and a friction lock for retaining said stop lever in adjusted position.

10. In a gaging and sorting apparatus, the combination with a measuring needle, a sliding member controlling the movement of the needle, a carrier and a stop member for said carrier adapted to arrest the latter at one of a plurality of delivery positions, of a locking member electrically controlled from the needle to engage and lock said sliding member when during the advance of the latter the needle contacts with a blank in the carrier.

11. In a gaging and sorting apparatus provided with a measuring needle, a member having a gaging surface for positioning a blank relatively to said needle, and a movable carrier containing an open sided blank holder for presenting a blank opposite the gaging surface in line with the needle, and in combination therewith, a yielding support in the line of movement of the carrier engaging a contained blank to position and hold the same laterally in the carrier, and a yielding abutment engaging the end of the blank to position and hold the same in contact with the gaging surface.

12. In a gaging and sorting apparatus provided with measuring devices including a member having a gaging surface and coöperating movable needle, and in combination therewith, a reciprocatory carrier for presenting a contained blank in position to engage the gaging surface and to be engaged by the needle, and means for varying the position of the carrier relatively to the needle when in measuring position, the same including an adjustable member for arresting the carrier and an adjustable member engaged by the carrier for displacing the latter relatively to the measuring needle.

13. In a gaging and sorting mechanism equipped with a supply station, measuring devices, a plurality of receiving stations, a movable carrier provided with a blank holder, and means for actuating said carrier to present said holder successively in register with the supply station, the measuring devices and any one of the receiving stations, and in combination therewith, blank feeding devices including a galley, a cut off and displacer at the delivery end of said galley and a transferrer, a plurality of ejectors, one for each receiving station, and yieldable actuating devices common to said ejectors.

14. In a gaging and sorting apparatus provided with a member having a gaging surface, a reciprocating gaging needle and a reciprocatory carrier and in combination therewith actuating devices for said carrier and needle including a driving gear, a driven gear, a shaft coupled with said driven gear, a cam coupled with said driven shaft and provided with a groove having a circular and laterally enlarged section, a movable support for the driving gear, yieldable means for moving said support to disconnect the driving and driven gears, and a pin coupled with said movable support and engaging the cam, to retain the driving and driven gears in operating relation during the passage of the circular section of the cam and to effect their disconnection at the enlarged section.

15. In a gaging and sorting mechanism provided with a member having a gaging surface, and a movable gaging member, and in combination therewith the following elements, to wit; a reciprocatory carrier provided with a blank holder and movable laterally of the gaging member to present the contained blank opposite the gaging surface; a supply station equipped with blank feeding devices and a plurality of blank receiving stations serially disposed in the direction of motion of the carrier; means for advancing the gaging member; selective positioning means controlled by the gaging member for arresting the carrier with its holder in register with either of the receiving stations; and automatic actuating mechanism for the carrier and gaging member including driving and driven members and means controlled by the driven member for uncoupling the driving member from the driven member.

16. In a gaging mechanism, the combination of the following elements, to wit; a member having a gaging surface for the blank; a gaging member movable with relation to said gaging surface; a reciprocatory carrier provided with a blank holder; means for adjusting the position of the carrier laterally of the gaging member; a microscope whose field includes the blank and gaging member; actuating mechanism for the carrier including driving and driven members; and automatic means for uncoupling the driving member from the driven member.

17. In a gaging and sorting machine the combination of the following elements, to wit; a member having a gaging surface; a gaging member movable perpendicularly to said gaging surface and adapted to engage a blank contacting with said gaging surface; means for advancing said gaging member; means for arresting the advancing means of the gaging member including electro magnetic devices in a circuit of which the gaging member and blank are terminals; a reciprocatory carrier provided with a blank holder and means for moving it positively in one direction by a step by step movement and yieldingly in the opposite direction; a supply station and a plurality of receiving stations successively disposed in the line of movement of the carrier; means for positioning the blank relatively to the gaging member and for maintaining the blank in contact with the gaging surface; a stepped or selective stop for the carrier; and connections intermediate the gaging member advancing means and said stepped or selective stop for setting the latter.

18. In a part having a gaging machine provided with a gaging surface for positioning the blank and a yielding gaging member movable transversely of said gaging surface and adapted to contact with the blank and in combination therewith actuating devices for advancing said gaging member; and electric circuit of which said movable gaging member and the blank constitute terminals, and means coupled with said circuit for arresting the actuating devices of the gaging member when the gaging member contacts with the blank.

19. In a gaging machine, the combination of the following elements, to wit; a member having a gaging surface for positioning the blank; a gaging member movable transversely of said gaging surface; a circuit of which the gaging members and blank constitute terminals; actuating devices for advancing the gaging member into contact with the blank; and means controlled by said circuit for locking the actuating devices of the gaging member when the latter contacts with the blank.

20. In a gaging machine, the combination of the following elements, to wit; a gaging surface for positioning the blank; a gaging member movable transversely of said surface; means for advancing said gaging member into contact with the blank; and means operably controlled by said gaging member and engaging the advancing means therefor, to arrest said advancing means immediately contact is effected with the blank, and thus prevent penetration of the latter.

21. In a gaging and sorting machine provided with a member having a gaging surface, a reciprocatory gaging member movable transversely of said gaging surface, a reciprocatory carrier, means for pressing a blank in the carrier into contact with said gaging surface, a plurality of receiving stations, and selective means for arresting the carrier in register with either receiving station and in combination therewith the following elements, to wit; means for advancing the movable gaging member into contact with a blank in the carrier while said blank is in contact with the gaging surface; means for arresting the advance of the movable gaging member at the instant of contact with the blank, and means for setting the selective carrier arresting devices according to the amount of movement of the gaging member.

22. In a gaging and sorting machine provided with a part having a gaging surface for positioning a blank, a gaging member movable transversely of said gaging surface and adapted to enter a depression or recess in a blank held in contact with said gaging surface, a reciprocatory carrier provided with a blank holder, a supply and a plurality of discharging stations serially disposed in the line of travel of the carrier, and in combination therewith the following elements, to wit; means for intermittently advancing the carrier to the supply station and the gaging surface successively; yieldable means for retracting the carrier past the discharging stations; means for discharging a blank from the supply station to the carrier selective means for interrupting the carrier in its movement past the discharging stations; adjusting devices for the movable gaging member controlling said selective arresting means; and means for ejecting the contained blank from the carrier at the designated discharging station.

23. In a gaging and sorting mechanism, the combination of the following elements, to wit; a reciprocatory blank carrier; a part having a gaging surface; means for maintaining a contained blank in the carrier in contact with said gaging surface; a reciprocatory gaging member movable transversely of said first named gaging surface and adapted to enter a cavity in the blank to measure the depth thereof; a supply and a plurality of receiving stations serially disposed in the line of travel of the carrier; means for arresting the carrier in register with the supply station; and means controlled by the movable gaging member for selectively arresting the carrier in register with that one of the receiving stations corresponding with the degree of advance of the movable gaging member at the time of its engagement with the depressed face of the contained blank.

24. In a gaging or sorting machine, the combination of the following elements, to wit; a reciprocatory carrier provided with a blank retaining seat; a part having a gaging surface and means for pressing a blank in the carrier into contact with said gaging surface; a reciprocatory gaging member movable transversely of said gaging surface; a plurality of blank receiving stations serially disposed adjacent the line of travel of the carrier; and means under the control of the movable gaging member for selectively arresting the carrier with its blank retaining seat opposite the receiving station corresponding with the measuring movement of said gaging member.

25. In a gaging and sorting machine, the combination of the following elements, to wit; a reciprocatory carrier provided with a blank retaining seat; a reciprocatory gaging or measuring member; a plurality of receiving stations serially disposed in the line of movement of the carrier; and means controlled by the gaging member and acting upon the carrier to selectively effect registration of its blank retaining seat with said receiving stations.

26. In a gaging and sorting mechanism such as described, the combination of the following elements, to-wit: a gaging mechanism including a relatively movable member having a gaging surface and needle; a blank translating mechanism including a movable carrier provided with a blank receiving seat, a blank supply station and means for reciprocating the carrier to bring the blank seat alternately into registry with the supply station and gaging mechanism; and a selective blank distributing mechanism including a plurality of receiving stations and means under the control of the gaging mechanism for directing the gaged blank to the receiving station corresponding with the indicated measurement.

27. A gaging and sorting apparatus such as described, including, in combination, the following elements, to wit: a part having a fixed gaging surface; a reciprocating carrier provided with an open-sided seat for the blank; a yielding support in the line of movement of the carrier for engaging a contained blank; a yielding abutment in position to engage the end of the blank opposite the gaging surface; an adjustable member engaging the carrier to limit its forward movement, an adjustable member engaging the carrier to displace it laterally; a gaging member or needle movable with relation to the gaging surface; a microscope whose field includes the blank and needle when in juxtaposition; means for advancing the needle into contact with the blank; means including an electric circuit of which the needle and blank constitute terminals and devices in said circuit for arresting the actuating devices of the needle when the latter contacts with the blank; a plurality of blank receiving stations serially located in the line of movement of the carrier; a series of ejectors, one for each blank receiving station; and actuating devices for the carrier and needle, the same including a driving gear, a driven gear, a shaft coupled with said driven gear, a cam coupled with said shaft and provided with a circular and laterally enlarged section, a movable support for the driving gear, yieldable means for moving said support to disconnect the driving and driven gears, and a pin coupled with said movable support and engaging the cam, substantially as described.

28. A gaging machine embodying means for positioning a blank and for determining the relation between two surfaces of the blank including a movable gaging member adapted to contact with the primary reference surface of the blank, and means independent of the blank for arresting the movement of the gaging member immediately when contact with the reference surface is effected.

29. A gaging machine embodying means for positioning a blank and for determining the relation between two surfaces of the blank including a movable spring supported gaging member adapted to contact with the primary reference surface of the blank, means for advancing the gaging member, and means independent of the blank for arresting the movement of the advancing means immediately when contact with the reference surface is effected.

30. In a gaging and sorting apparatus, the combination of the following instrumentalities, to wit, gaging members having their operative surfaces facing in the same direction and movable with relation to each other to gage the distance between surfaces on the blank facing in the same direction but opposite to that in which the surface of the gaging members face, means for holding the blank in contact with one of said gaging members, delivering mechanism for removing and sorting the gaged blanks, and means for determining the movement of the delivering mechanism set in accord with the relative movement of the gaging members, whereby the blanks will be sorted in accordance with the relation of their gage engaging surfaces.

31. In a gaging and sorting apparatus, the combination of the following instrumentalities, to wit: gaging members having their operative surfaces facing in the same direction and movable with relation to each other to gage the distance between surfaces on the blank facing in the same direction but opposite to that in which the surfaces of the gaging members face, means for advancing one of said gaging members with relation to the other, means for holding the blank in contact with one of said members, delivering mechanism for removing and sorting the gaged blanks, a stop mechanism for variably determining the movement of the delivering mechanism, and operating connections intermediate the stop mechanism and gage advancing mechanism whereby the stop mechanism will be adjusted in accordance with the advance of the gage to determine the movement of the delivering mechanism.

32. In a gaging and sorting apparatus, the combination of the following instrumentalities, to wit, a fixed gage, a normally retracted movable gage having its gaging surface facing in the same direction as that of the fixed gage, mechanism for advancing the movable gage, means for holding a blank in contact with the fixed gage and in position for coöperating with the movable gage, delivering mechanism for removing and sorting the gaged blanks, a stop mechanism for variably determining the movement of the delivering mechanism, operating connections intermediate the gage advancing mechanism and stop mechanism for positioning the latter in accordance with the advance of the movable gage whereby gaged blanks will be sorted in accordance with the relative position of their gage engaging surfaces.

33. In a gaging and sorting apparatus, the combination of the following instrumentalities, to-wit, a fixed gage, a normally retracted movable gage, mechanism for advancing the movable gage, means for holding a blank in contact with the fixed gage and in position for coöperation with the movable gage, means for locking the movable gage against forward movement when contact with the blank is effected, delivering mechanism for removing and sorting the gaged blanks, a stop mechanism for variably determining the movement of the delivering mechanism, operating connections intermediate the gage advancing mechanism and stop mechanism for advancing the latter in accordance with the advance of the gage, means for holding the stop mechanism in adjusted position when the gage advancing mechanism returns to normal position, and means for returning the stop mechanism to normal position after the operation of the delivering mechanism to deliver a gaged blank.

FRANK HINMAN PIERPONT.

Witnesses:
H. D. JAMESON,
C. P. LIDDON.